July 3, 1934.                    J. E. LODGE                        1,965,422
                         TEMPERATURE INDICATING DEVICE
                              Filed Oct. 15, 1931
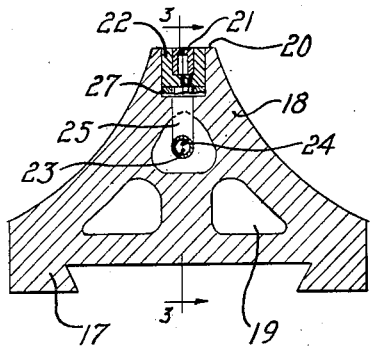
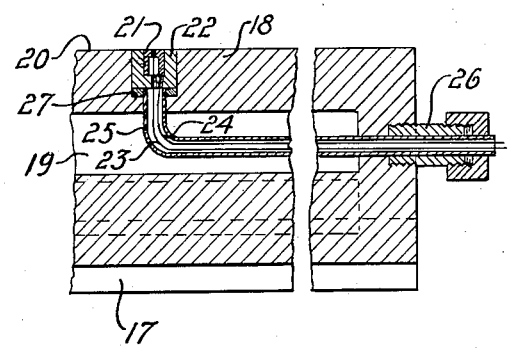
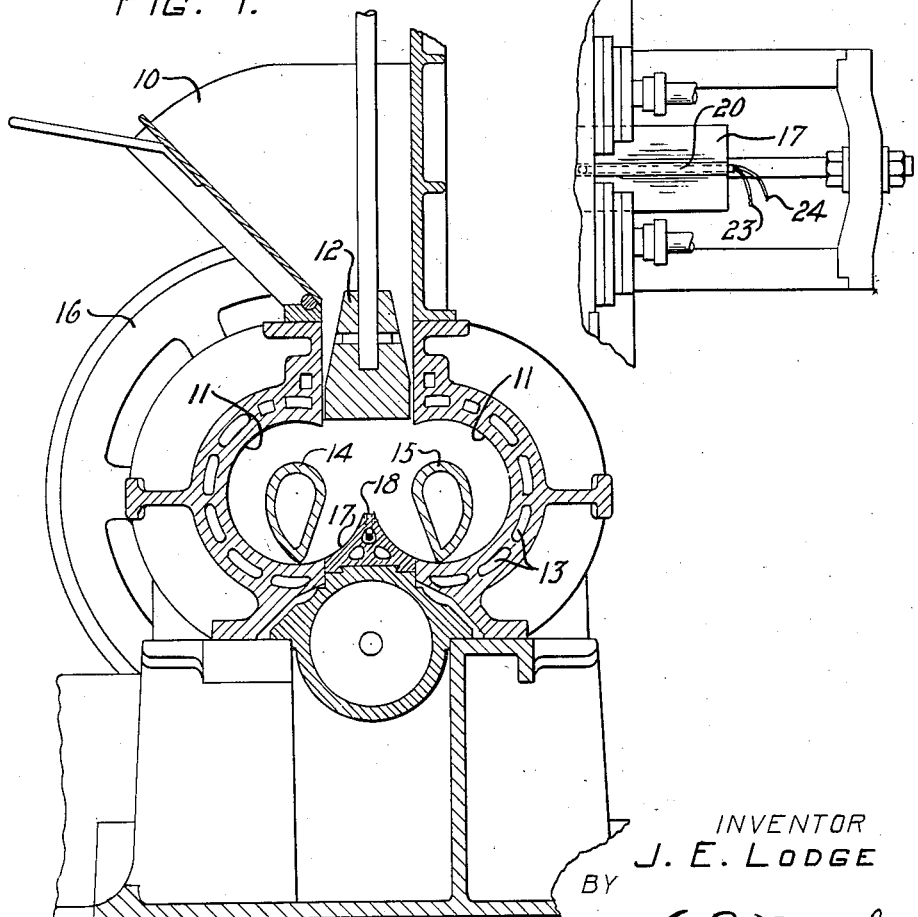
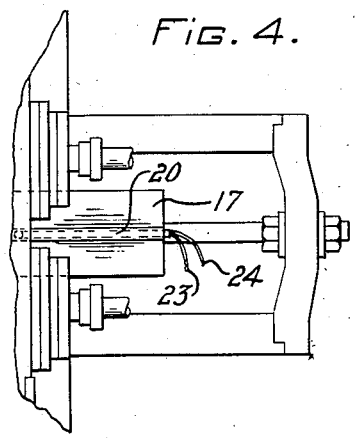
INVENTOR
J. E. LODGE
BY
E. R. Moulan
ATTORNEY Patented July 3, 1934

1,965,422

UNITED STATES PATENT OFFICE 1,965,422

TEMPERATURE INDICATING DEVICE

Joseph E. Lodge, Baltimore, Md., assignor to Western Electric Company, Incorporated, New York, N. Y., a corporation of New York Application October 15, 1931, Serial No. 568,959

1 Claim. (Cl. 18—2)

This invention relates to machines for mixing compounds, such as rubber and the like, and particularly to a means for indicating the temperature of the compound within the mixing chamber of the machine.

In machines for mixing or kneading compounds, such as rubber and the like, a series of rotors or rolls continuously mix or knead the compound within a cooled mixing chamber, while the temperature of the compound is maintained within predetermined limits.

The object of this invention is to provide a means for accurately and efficiently determining the temperature of the compound within the mixing chamber so that the flow of cooling medium, or mixing procedure can be varied to maintain the desired temperature of the compound.

A further object is to control or modify the additions of the various ingredients forming the compound by the aid of the temperatures indicated, so that the character or quality of the compound may be controlled.

A further object of the invention is to provide a means for determining for any desired purpose the temperature of the compound within the mixing chamber in simple form for use with mixing machines already installed.

In attaining these objects a thermocouple is installed in the crown of the sliding dump gate of a mixing machine where the same extends between the surfaces of the mixing rotors or rolls, which in machines of this type is the vital point of the compound within the mixing chamber, or the point where the most violent mixing action takes place and determines the proper temperature of the compound.

Other objects and advantages of the invention will be understood by reference to the following specification and accompanying drawing, in which Fig. 1 is a section through the mixing chamber of a mixing machine in accordance with the invention, Fig. 2 is an enlarged sectional view of the sliding dump gate of the mixing machine shown in Fig. 1, Fig. 3 is a sectional view taken on line 3—3 of Fig. 2, and Fig. 4 is a plan view of a portion of the sliding dump gate of a mixing machine similar to the machine shown in Fig. 1.

In the drawing, the usual simple form of mixing machine is shown by way of illustration. Referring to Fig. 1, the rubber compound is placed in the hopper 10 of the mixing chamber where it is forced toward the mixing chamber 11, preferably by means of a weight 12. The mixing chamber 11 during the operation of the machine becomes heated and is therefore constructed with double walls which provide a cooling chamber 13 therebetween through which is circulated a cooling medium. To carry out the kneading or mixing operation, the mixing chamber has rotating therein cooperating rotors or rolls 14 and 15 driven by any suitable means such as driving gearing 16.

When the compound has been properly mixed, it is necessary to quickly remove the same from the mixer for further treatment, such as working into final form and vulcanizing. For this purpose a piston operated sliding dump gate 17 is provided, which forms the lower portion of the mixing chamber, which is operated to release the compound from the mixing chamber. This gate 17 is extended by means of a central portion or crown 18 between the rotors or rolls 14 and 15 and is provided with a cooling chamber 19 through which is circulated a cooling medium connected by suitable piping (not shown) to the cooling system for the cooling chamber 13 of the mixing chamber 12. The central portion or crown 18 is provided with a flat surface 20, which is the vital area in the mixing chamber where the most violent mixing takes place, and is therefore the area at which the temperature of the mixing compound is most desired. The temperature of the mixing compound in this area must be maintained within certain predetermined limits to obtain the proper compound and is maintained by the use of more or less of the cooling medium.

To ascertain the temperature at this area, a temperature indicating device is provided in the form of a thermocouple 21 embedded in the crown of the sliding gate and flush with the surface 20 at approximately the central point of the sliding dump gate. The thermocouple 21 is surrounded by insulating material 22, such as fibre, to prevent its being affected by the temperature of the gate. The conductor leads 23 and 24 from the thermocouple 21 are connected to any suitable recording or temperature indicating instrument (not shown) located beyond the machine for the convenience of the operator. These conductor leads are run from the thermocouple through a conduit 25 of any suitable material, which passes through a section of the cooling chamber 19 and the end wall of the sliding dump gate, which is provided with a stuffing box 26 of any suitable type preventing leakage of the cooling medium from the cooling chamber. A suitable packing material 27 is also interposed between the insulation 22 and conduit 25 to prevent leakage of the cooling medium from the crown 18 and also to prevent the same from affecting the thermocouple 21.

While the invention is illustrated and described more particularly with reference to a compound mixing machine for rubber and the like, the invention is not confined thereto, but is intended to cover any other uses or modifications within the scope of the appended claim.

What is claimed is:

In a mixing machine provided with a mixing chamber, cooperating rotors within said chamber, a sliding dump gate having a crown section extending between said rotors, a source of thermoelectric current located midway of said gate and embedded within the crown section of said gate so as to be flush with the surface thereof, said source of thermoelectric current being insulated from the gate and having a surface exposed to the interior of the mixing chamber, and electrical conductors connected to the source of thermoelectric current and brought to the exterior of the mixing machine for connection to current measuring apparatus.

JOSEPH E. LODGE.